MAGNETIC DOMAIN PROPAGATION INVERTER

Filed Dec. 23, 1965

INVENTOR
R. A. KAENEL
BY Herbert M. Shapiro
ATTORNEY 1 2

3,454,937

MAGNETIC DOMAIN PROPAGATION INVERTER

Reginald A. Kaenel, Chatham, N.J., assignor to Bell Telephone Laboratories, Incorporated, New York, N.Y., a corporation of New York Filed Dec. 23, 1965, Ser. No. 515,897
Int. Cl. G11b *5/62;* G11c *11/02*
U.S. Cl. 340—174 8 Claims

ABSTRACT OF THE DISCLOSURE

A domain propagation device provides an inversion function when the magnetization of buffer zones between next adjacent domains is reversed. Domain walls are formed where none exist prior to such a reversal. Also, existing domain walls are annihilated by such a reversal. Binary ones are generated where zeros existed in the first instance and vice versa in the second.

This invention relates to information inverters and, more particularly, to inverters comprising a magnetic medium.

Binary information is stored in magnetic devices as indicative directions of magnetization. For example, in response to input information during a write operation, a magnetic device may be switched to a first direction of magnetization or retained in a second direction of magnetization depending on the presence (binary one) or absence (binary zero) of an input pulse. Outputs from such a device are typically provided by later switching the magnetization to the second direction. Of course, this read-out mode provides an output pulse only when magnetization had been switched to a first direction during a previous write operation. Otherwise, only negligible flux shuttling occurs.

Frequently, an output is required during a read operation regardless of the state of the magnetic device determined during a write operation as is well known. There are a variety of logic circuit arrangements which provide such operation. Such circuits typically include first and second flip-flops. The first flip-flop is set by strobe pulses commonly present in unipolar operation. When an output from the magnetic device appears concurrently with the strobe pulse, cancellation occurs and the first flip-flop is not set. The second flip-flop is set by an output pulse alone. Such logic circuits are relatively expensive. More importantly, however, the output pulse from the magnetic device is of a shape such that it is not completely canceled by the strobe pulse. Consequently, such devices are characterized by a relatively low signal-to-noise ratio which is improved only at the expense of additional circuitry.

One magnetic device which provides an output pulse of a type which is not easily canceled is known as a domain wall device. A domain wall device comprises a magnetic material in which a reverse (magnetized) domain is provided in response to a first magnetic field in excess of a characteristic nucleation threshold and through which that reverse domain is moved in response to a second field in excess of a characteristic propagation threshold and less than the nucleation threshold. The magnetic material of such a device conveniently comprises a wire of a compensated permalloy such as is described in copending application Ser. No. 405,692, filed Oct. 22, 1964, for D. H. Smith and E. M. Tolman, now Patent No. 3,350,199. Ordinarily, magnetization of a magnetic wire of a domain wall device is initialized to a first (forward) direction of magnetization and the magnetization of limited (stable) portions of the wire is reversed to a second (reverse) direction indicating the storage of a binary one. Operation is unipolar, a reverse domain being stored or not depending on the presence or absence of an input (nucleation) pulse with its associated first field. Reverse domains stored in the magnetic wire are propagated along the wire in a step-by-step fashion in response to propagation pulses which provide an alternating pattern of spaced apart second fields in the wire. The timing of the propagation pulses and input information is such that reverse domains are nucleated in bit locations spaced apart by what are called "duffer zones" herein. Stored reverse domains induce output pulses in a detector coupled to the magnetic wire at a remote output position.

An object of this invention is, accordingly, to provide a new and novel magnetic information inverter.

The foregoing and further objects of this invention are realized in one embodiment thereof wherein sequential binary information is stored as the presence or absence of a reverse domain in corresponding input positions of first and second magnetic wires in response to the presence or absence of an input pulse. The stored information is moved along the wires until an input character (word) is stored. The propagation operation is then interrupted and the magnetization of all the buffer zones in the second wire is reversed inverting each information bit stored in the wire. Propagation is then resumed. Output pulses are provided at a detector coupled to an output position in the first wire for each reverse domain stored. An output pulse is provided at a detector coupled to an output position in the second wire for each of those positions where reverse domains were initially absent.

Accordingly, a feature of this invention is a domain wall device including a magnetic wire where information is stored as the presence and absence of reverse domains in bit locations spaced apart by buffer zones, and means for reversing the magnetization of all the buffer zones in the wire.

Since the inversion of stored information corresponds to the NOT function in logic operations, universal logic arrangements such as AND–NOT, OR–NOT, and exclusive–OR circuits are provided by reversing the magnetization of buffer zones to each side of an input position in which information is stored via (logic) multiple inputs before that information is propagated to an output position.

Accordingly, a further feature of this invention is a new and novel magnetic logic circuit wherein the magnetization of the buffer zones to each side of an input position is reversed for inverting information stored in that input position in response to multiple inputs.

The foregoing and further objects and features of this invention will be understood more fully from a consideration of the following detailed discussion rendered in conjunction with the accompanying drawing, wherein.

Figure 1:
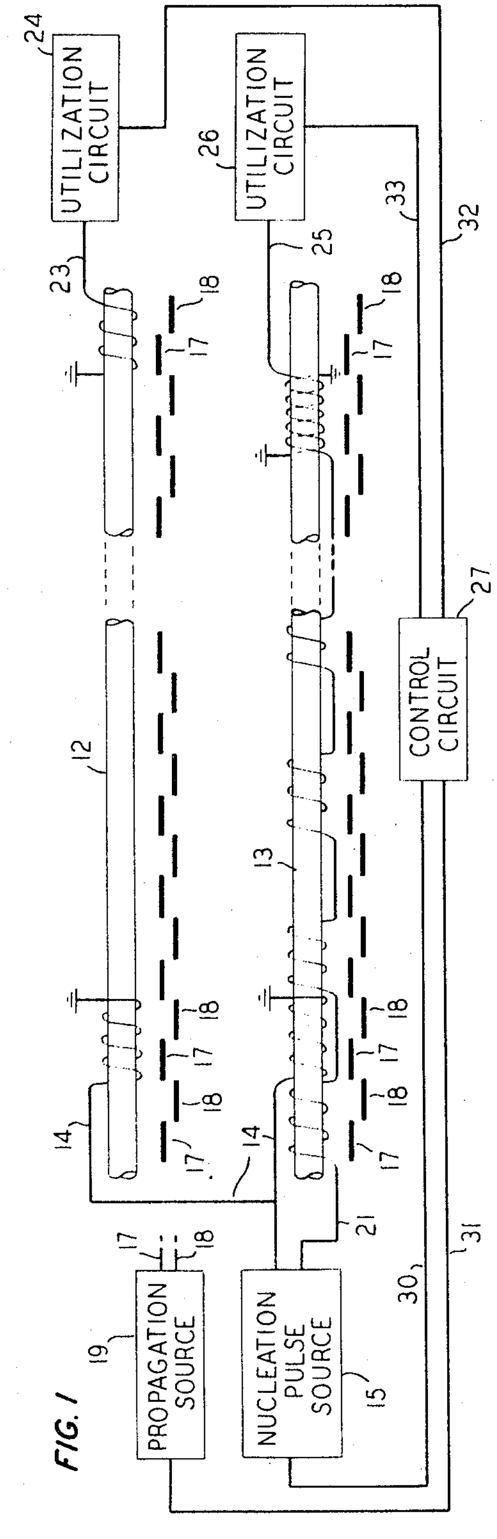
FIG. 1 is a schematic illustration of an inverter in accordance with this invention.

FIG. 1 shows an inverter 10 in accordance with this invention. The inverter comprises first and second magnetic wires 12 and 13 of the type described. A conductor 14 is coupled in a like sense to corresponding input positions of wires 12 and 13. Conductor 14 is connected between a nucleation pulse source 15 and ground, the coupling thereof to the two wires 12 and 13 being electrically in parallel. Both wires 12 and 13 are coupled by first and second propagation conductors 17 and 18 represented by horizontal line indications. Such conductors are coupled to each wire in an alternating sense and at interleaved positions in a well known manner to provide fields, when activated, for moving reverse domains through the wires. Conductors 17 and 18 are connected between a propagation source 19 and ground.

As has been stated hereinbefore, the storage of domains in wires 12 and 13 is at storage locations spaced apart by buffer zones. A conductor 21 couples wire 13 at all the buffer zones therein. Conductor 21 is connected between a pulse source which is, conveniently, nucleation pulse source 15. Pulse source 15, then, includes means for selectively pulsing conductor 14 or conductor 21.

An output conductor 23 is coupled to an output position in wire 12. Conductor 23 is connected between a utilization circuit 24 and ground. An output conductor 25 is coupled to wire 13 at an output position in wire 13 slightly closer to the input position in wire 13 than is conductor 23 with respect to the input position in wire 12. This is explained more fully hereinafter. Output conductor 25 is connected between utilization circuit 26 and ground. Nucleation pulse source 15, propagation source 19, and utilization circuits 24 and 26 are connected to a control circuit 27 by means of conductors 30, 31, 32, and 33, respectively. The various sources and circuits may be any such elements capable of operating in accordance with this invention.

For purposes of illustration, let us assume that a binary character 1011 is to be stored in the inverter 10 and that an output is required for each bit.

In operation then, nucleation pulse source 15 pulses conductor 14 for nucleating a reverse domain in the coupled) input positions of wires 12 and 13 under the control of control circuit 27. Propagation pulse source 19 provides alternating pulses, in a manner to be described in more detail hereinafter, in propagation conductors 17 and 18 for generating the fields for stepping stored reverse domains towards the output positions. As is explained hereinafter, four propagation pulses are required to move a stored domain from an input position to a next adjacent bit location. Concurrently with the fourth propagation pulse after the storage of the first reverse domain (representing a binary "1") nucleation pulse source 15 is again pulsed to provide a second reverse domain in corresponding positions of wires 12 and 13. Control circuit 27 includes timing circuitry for so synchronizing the input and propagation pulses thus insuring the proper spacing of adjacent bits by buffer zones.

Concurrently with the eighth propagation pulse, no pulse appears on conductor 14, under the control of control circuit 27. In this manner, no reverse domain is provided in the corresponding position of wires 12 and 13 indicating the storage of a binary "0." Concurrently with the twelfth propagation pulse, nucleation pulse source 15 again pulses conductor 14 for storing an additional reverse domain in wires 12 and 13. As a result of the described sequence of pulses, the illustrative binary character 1011 is stored in each of wires 12 and 13 as shown for wire 12 in FIG. 2.

Figure 2:
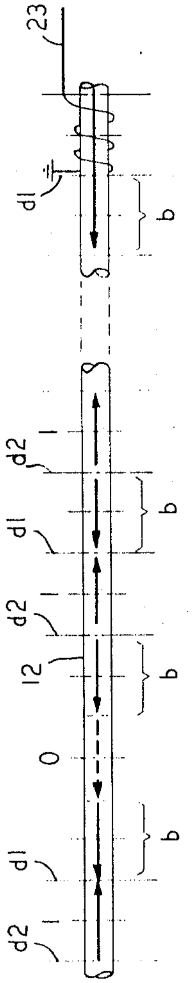
FIGS. 2, 3, 5 and 6 are schematic illustrations of portions of the inverter of FIG. 1 depicting magnetization configurations therein.

For purposes of illustration, the magnetization of wires 12 and 13 is assumed initially in a first direction represented by arrows directed to the left as indicated for the buffer zones *b* in FIG. 2. Reverse domains, accordingly, are represented by arrows directed to the right in the bit locations designated by a "1" in FIG. 2. Each reverse domain defines leading and traling domain walls *d*1 and *d*2, respectively, with the buffer zones as indicated by the vertical lines, so designated, bounding arrows directed to the right, in FIG. 2. A binary zero is represented as a broken arrow directed to the left in the correspondingly designated ("0") location as shown in FIG. 2. No leading and trailing domain walls are formed when a binary "0" is stored because the magnetization (direction) of the bit location including a stored "0" is the same as that of the buffer zones. The position of such walls, were they present, is indicated by the vertical broken lines bounding the broken arrow in FIG. 2.

Propagation of stored information is now stopped conveniently by inhibiting propagation source 19 under the control of control circuit 27. Thereafter, pulse source 15 pulses conductor 21 for reversing the magnetization direction of all the buffer zones in wire 13. The magnetization of the buffer zones, when so reversed, is represented by arrows directed to the right in the buffer zones of wire 13 as shown in FIG. 3.

Figure 3:
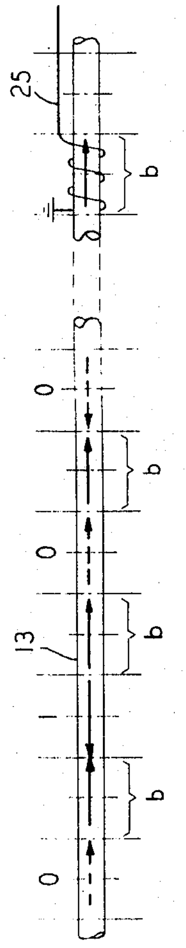

An examination of FIG. 3 reveals that the domain wall between a bit location in which a reverse domain (binary "1") is stored and an adjacent buffer zone of opposite magnetization disappears when the magnetization of that buffer zone is reversed. This is because the bit location and the buffer zone have like magnetizations after the reversal. On the other hand, it is clear that between each bit location where no reverse domain is stored (binary "0") and an adjacent buffer zone of like magnetization, a domain wall appears when the magnetization of the buffer zone is reversed. Consequently, when the magnetization of the buffer zones in wire 13 is reversed, the domain walls associated with each stored "1" disappear and domain walls are provided where previously absent. But the nature of stored information is indicated only by the movement of domain walls through the portion of wires 12 and 13 coupled by an output conductor. Therefore, whenever a binary "1" is stored in wire 13 prior to the reversal of the magnetization of the buffer zones in that wire, the corresponding domain walls are extinguished and no corresponding output is later provided. But where a binary "0" is initially stored, domain walls are provided and corresponding outputs result. After the reversal of the magnetization of the buffer zones in wire 13 the information stored therein may be represented as 0100 whereas the information stored in corresponding locations of wire 12 is still 1011, the illustrative word. It is clear that the information initially stored in wire 13 is inverted.

Propagation of stored information is now resumed under the control of control circuit 27 for moving stored information toward the output positions. For each domain wall arriving at the output position a pulse is induced in the corresponding output conductor. Leading and trailing domain walls induce pulses of opposite polarity in the output conductors. Either one may be discriminated against, if desired, under the control of control circuit 27. It is clear, in any case, that utilization circuit 24 detects pulses in conductor 23 arranged as pulse, pulse, pause, and pulse, while utilization circuit 25 detects pulses in conductor 25 arranged as pause, pause, pulse, and pause at corresponding times. Thus, a pulse is provided in utilization circuit 24 for each binary "1" stored and a pulse is provided in utilization circuit 26 for each binary "0" initially stored. Wire 13 is initialized before the operation is repeated. The initializing step is carried out most conveniently by a pulse on nucleation conductor 14 and by the propagation of the resulting domain through the register under the control of control circuit 27.

Figure 4:
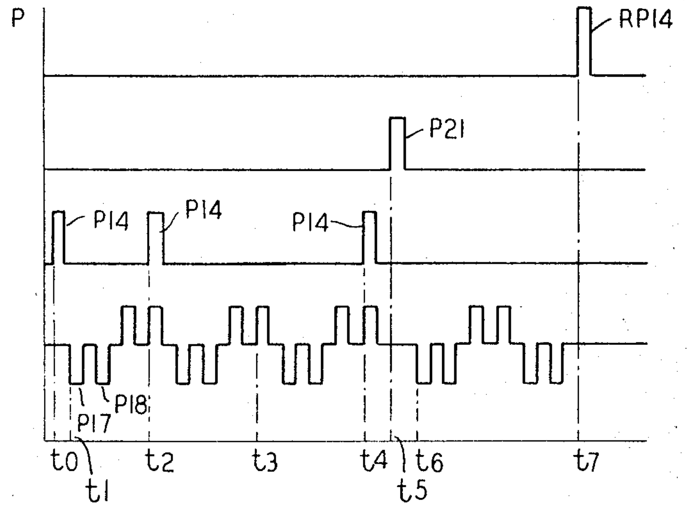
FIG. 4 is a pulse diagram for the operation of the inverter of FIG. 1.

The illustrative operation is summarized in connection with the pulse diagram of FIG. 4. At a time designated *t*0 nucleation pulse source 15 pulses conductor 14 as indicated by the pulse designated P14 at that time in FIG. 4. The propagation pulses P17 and P18 are initiated thereafter at a time designated *t*1. For every fourth propagation pulse a nucleation pulse P14 is present or absent in conductor 14. For the assumed illustrative operation, a nucleation pulse P14 is present at times *t*2 and *t*4 and absent at time *t*3 as indicated. Operation is interrupted after the termination of the pulses applied at time *t*4. At an arbitrary time *t*5 thereafter a pulse P21 is applied to conductor 21 for reversing the buffer zones as described. Thereafter, at a time designated *t*6, propagation pulses are resumed for providing output pulses. A reset operation of wire 13 is initiated at a time designated *t*7 with a pulse, designated RP14 in FIG. 4, in conductor 14. The reset operation is under the control of control circuit 27. Control circuitry 27 conveniently includes circuitry for appropriately terminating the propagation operation.

Importantly, the distance between input and output positions in wire 12 is greater than is the distance between input and output positions in wire 13. The reason for this is explained in connection with FIGS. 5 and 6.

Figure 5:
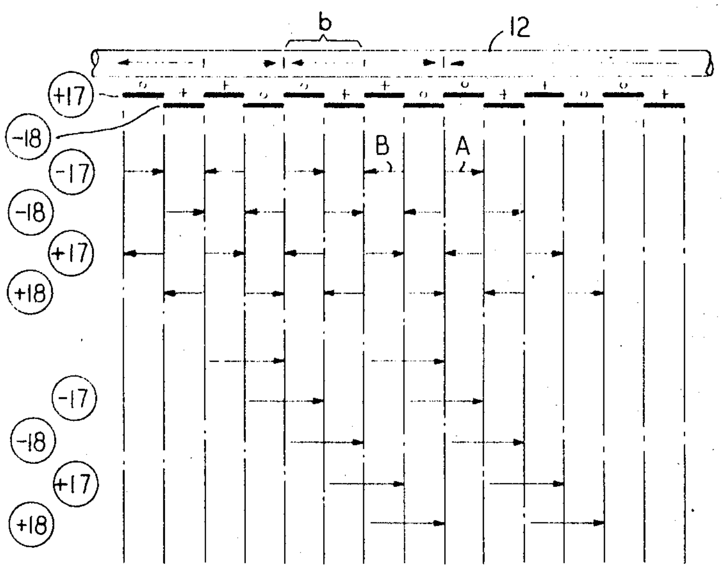
Figure 6:
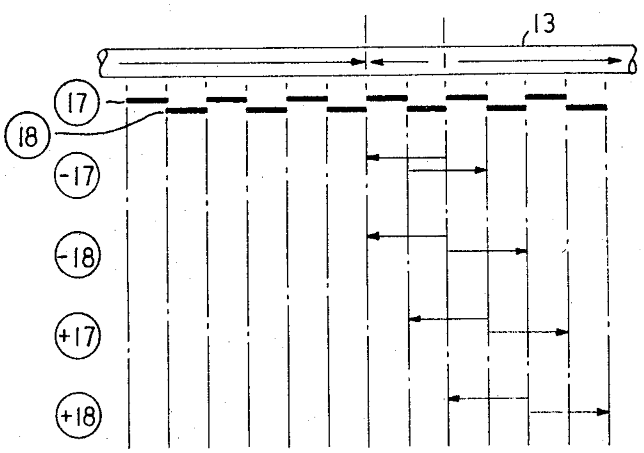

Consider two adjacent bit locations each including a reverse domain represented by a binary "1" as indicated in FIG. 5. The propagation conductors for moving those reverse domains are represented as spaced apart horizontal lines 17 and 18, correspondingly numbered lines representing adjacent couplings of the corresponding conductors to the wire 12. A positive flow of current in conductor 17 is indicated as an encircled +17 beneath the representation of wire 12 in FIG. 5. Adjacent horizontal representations of the couplings of conductor 17 to wire 12 have dot and plus indications associated with them. These dots and plus signs indicates that when a current flows in a positive direction in conductor 17 it flows, essentially, in opposite directions in adjacent couplings therein as indicated. The same is true for conductor 18 as similarly represented in FIG. 5 for negative current flow (−18). Taking dots to represent current flowing out of the plane of the paper and plus signs to represent current flowing into the plane of the paper, we find, via the right-hand rule, that the direction of the field (in the magnetic wires 12 and 13) associated with each coupling is as indicated in the figure beneath the corresponding coupling.

The fields are represented by arrows directed to the left or to the right depending on whether current is directed out of the plane of the paper at the corresponding coupling or into the plane of the paper, respectively. Four sets of arrows are shown, the first for a negative current in conductor 17 represented by an encircled −17, the second, a negative current on conductor 18, represented by an encircled −18, and positive currents on conductors 17 and 18, represented as enriched +17 and +18. The arrow pattern for positive current flow is from left to right as viewed, represented as arrows directed alternately left then right. The arrow pattern for negative current flow is opposite to that of positive current flow.

Consider what happend when the sequence of pulses −17, −18, +17, and +18 are applied to conductors 17 and 18. For each pulse, the corresponding field pattern is generated in wire 12. It is clear that on each occasion the leading wall of each reverse domain is moved to the right, as viewed, in response to those pulses. The reason for this is that the field (for example as represented by the arrow A in FIG. 5) affecting that wall is in the same direction as the magnetization within the reverse domain. It is equally clear that the trailing domain wall of each reverse domain also moves to the right in response to those fields. The reason for this is that the field (for example as represented by the arrow B in FIG. 5) affecting that wall is in the same direction as the magnetization of the buffer zone there. The advance of the reverse domains is depicted in FIG. 5 in successive steps shown corresponding to the driving pulses. It is clear that the reverse domains are moved to the right in response to each pulse.

This is not the case when information is inverted. This is illustrated for an "inverted 0" which is a reverse domain stored in wire 13. The "inverted 0" is indicated by an arrow directed to the left in FIG. 6. For simplicity, it is assumed that the "inverted 0" occupies the same position as does the reverse domain to the right as viewed in FIG. 5. Then the field patterns shown in FIG. 5 pertain in this situation. The advance of the reverse domain (bounded arrows directed to the right) in that same position in FIG. 5 is repeated in FIG. 6 for comparison. The corresponding advance of the "inverted 0" (bounded arrows directed to the left) in response to the same set of fields is seen to be different. Specifically, the "inverted 0" remains unmoved by the fields generated by negative pulses first in conductor 17 and then in conductor 18. Thereafter the "inverted 0" advances as described hereinbefore. Consequently, an "inverted 0" in wire 13 is two pulses behind a corresponding binary "1" in wire 12. Output conductors 23 and 25, therefore, are positioned to provide synchronized outputs in spite of this change in position.

It is noted that a reverse domain in wire 12 is magnetized in a direction opposite to that of a reverse domain in wire 13. This serves to point out that the term "reverse domain" applies to any defined region of a wire where the magnetization is "reversed" from the direction of the magnetization of the buffer zones of the corresponding wire. The only practical consequence of the reverse domains having magnetization opposite to one another is that the domain in wire 12 induces a negative, then a positive, pulse in conductor 23 as its leading and trailing domain walls traverse the coupling therebetween. The domain in wire 13 induces first a positive and then a negative pulse, similarly, in conductor 25. The negative (or positive) pulses may be discriminated against, as mentioned hereinbefore, and the relative positions of conductors 23 and 25 adjusted so that the positive (or negative) output pulses are synchronized.

Although an inverter in accordance with this invention has obvious utility when a multibit character is stored therein prior to an inversion operation as described, the utility of such devices is also apparent when, for example, only a single bit is stored prior to the inversion operation.

Figure 7:
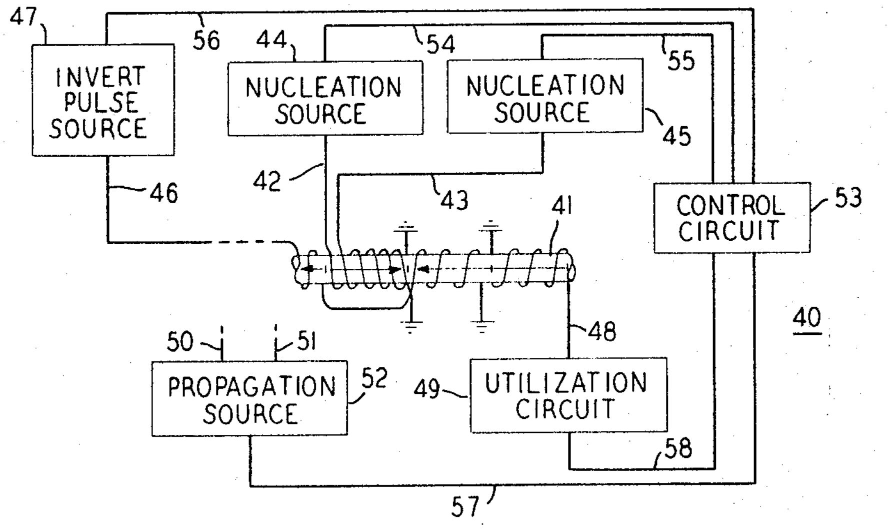
FIG. 7 is a schematic illustration of a universal logic arrangement in accordance with this invention.

Such utility is apparent from a consideration of a class of universal logic arrangements represented as shown in FIG. 7. Specifically, FIG. 7 shows a universal logic arrangement 40 including a magnetic wire 41 of the type described. First and second input conductors 42 and 43 are coupled to wire 41 at a first (input) position therein. Conductors 42 and 43 are connected between first and second nucleation sources 44 and 45, respectively, and ground. A conductor 46 is coupled to the buffer zones of wire 41 next adjacent the first position. Conductor 46 is connected between an invert-pulse source 47 and ground. An output conductor 48 is coupled to a second (output) position spaced apart from the first position by a buffer zone. Conductor 48 is connected between a utilization circuit 49 and ground. Propagation conductors 50 and 51 (shown incomplete) are coupled to wire 41 in a manner described hereinbefore. Conductors 50 and 51 are connected between a propagation pulse source 52 and ground. Sources 44, 45, 47, and 52, and utilization circuit 49 are connected to a control circuit 53 via conductors 54, 55, 56, 57 and 58, respectively. The various sources and circuits may be any such elements capable of operating in accordance with this invention.

Operation of the arrangement of FIG. 7 is analogous to that of the circuit of FIG. 1. That is to say, information is stored in a first position of wire 41, the magnetization of the buffer zones is reversed, and the information is propagated to the output position. It is not necessary to reiterate the operation in detail. Consider, however, an operation wherein opposite polarity pulses are applied to conductors 42 and 43 by means of nucleation sources 44 and 45 under the control of control circuit 53. The pulses generate equal and opposite fields in the first position of wire 41. No reverse domain results. The magnetization of the buffer zones is reversed by a pulse on conductor 46 by means of invert-pulse source 47 under the control of control circuit 53. An "inverted 0," that is, a reverse domain, appears in the first position of wire 41. Propagation pulse source 52 thereafter pulses conductors 50 and 51, under the control of control circuit 53, to move the reverse domain to the output (second) position for inducing a pulse in conductor 48.

Figure 8:
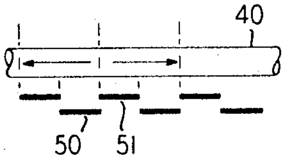
FIGS. 8 and 9 are schematic illustrations of a portion of the logic arrangement of FIG. 7 showing magnetization configurations therein.
Figure 9:
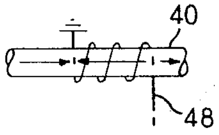

If the magnetic wire is assumed initialized to a magnetization condition represented by an arrow directed to the left in FIG. 7, a reverse domain is represented therein initially at an arrow directed to the right also as shown in FIG. 7. For the present operation no reverse domain is provided in response to the input pulses, but when the magnetization of the buffer zones is reversed as represented by the arrows directed to the right as viewed in FIG. 8, a reverse domain (inverted 0) appears in the first position. This last-mentioned reverse domain is indicated by an arrow directed to the left as viewed. When that reverse domain is propagated to the output position of wire 41, as shown in FIG. 9, it induces a pulse in output conductor 48. Any early output indications are ignored.

The device then operates as an exclusive-OR circuit. That is, if pulses appear concurrently on conductors 42 and 43, no reverse domain is nucleated. A reversal of the buffer zones (a NOT operation) provides a reverse domain only if one were absent initially.

An OR-NOT operation is provided if pulse sources 44 and 45 apply like polarity pulses (in excess of the nucleation threshold) to conductors 42 and 43. Alternatively, an AND-NOT circuit is provided if like polarity pulses are required on both conductors 42 and 43 for nucleating a reverse domain.

In the logic arrangements in accordance with this invention, a reset operation is provided conveniently in a manner analogous to that described hereinbefore.

No effort has been made to exhaust the possible embodiment of this invention. It will be understood that the embodiment described are merely illustrative of the principles of this invention and that various modifications may be made therein by one skilled in the art without departing from the scope and spirit of the invention.

What is claimed is:

1. A magnetic circuit comprising a magnetic medium having a first magnetization condition, means defining bit locations and buffer zones in said medium, input means for selectively providing a second magnetization condition at a first bit location in said medium, means responsive to a first signal for driving said buffer zones to said second magnetization condition simultaneously, propagation means for propagating magnetization conditions through said medium, means coupled to an output position in said medium for detecting magnetization conditions, and means for inhibiting said propagation means for stopping the propagation of said magnetization conditions when said buffer zones are driven to said second magnetization condition.

2. A magnetic circuit in accordance with claim 1 wherein said magnetic medium comprises a wire of a magnetic material in which reverse domains are provided in response to first magnetic fields in excess of a characteristic nucleation threshold and through which those reverse domains are moved in response to second magnetic fields in excess of a characteristic propagation threshold and less than said nucleation threshold, and said second magnetization conditions are reverse domains.

3. A magnetic circuit in accordance with claim 2 wherein said input means comprises first and second field generating means for generating equal and opposite magnetic fields in said first bit location.

4. A magnetic circuit in accordance with claim 2 wherein said input means comprises first and second field generating means for together generating said first magnetic field for providing a reverse domain in said first bit location.

5. A magnetic circuit in accordance with claim 2 wherein said input means comprises first and second field generating means, either of said first and second field generating means being capable of generating said first magnetic field for providing a reverse domain in said first bit location.

6. An information inverter comprising a first magnetic wire of a material in which reverse domains are provided in response to first fields in excess of a characteristic nucleation threshold and through which those reverse domains are moved in response to second fields in excess of a characteristic propagation threshold and less than said nucleation threshold, input means for selectively providing said first field in a first position of said first magnetic wire, propagation means for providing a pattern of said second fields for stepping reverse domains through said first wire, means defining bit locations and buffer zones in said first wire, means for reversing the magnetization of said buffer zones, means for inhibiting said propagation means for stopping the stepping of reverse domains when the magnetization of said buffer zone is reversed, and detection means coupled to said first wire at a second position remote from said first position.

7. In combination with an inverter in accordance with claim 6, a second magnetic wire of a material like that of said first wire, said input means being operative for selectively providing said first field in a first position of said second wire, said propagation means being operative for providing a like pattern of said second fields for synchronously stepping reverse domains through said wire, said means defining bit locations and buffer zones in said first wire being operative for defining bit locations and buffer zones in said second wire, means for inhibiting said propogation means, and detection means coupled to said second wire at a second position remote from said first position in said second wire.

8. A combination in accordance with claim 7 wherein said first and second positions in said first wire are more closely spaced than the first and second positions in said second wire to insure synchronized outputs.

References Cited

UNITED STATES PATENTS

| | | | |
|---|---|---|---|
| 3,069,661 | 12/1962 | Gianola | 340—174 |
| 3,172,089 | 3/1965 | Broadbent | 340—174 |
| 3,295,114 | 12/1966 | Snyder | 340—174 |

BERNARD KONICK, *Primary Examiner.*

BARRY L. HALEY, *Assistant Examiner.*